United States Patent
Chong

(10) Patent No.: US 11,633,722 B2
(45) Date of Patent: Apr. 25, 2023

(54) CATALYST FOR WATER SPLITTING

(71) Applicant: UCHICAGO ARGONNE, LLC, Chicago, IL (US)

(72) Inventor: Lina Chong, Westmont, IL (US)

(73) Assignee: UChicago Argonne, LLC, Chicago, IL (US)

( * ) Notice: Subject to any disclaimer, the term of this patent is extended or adjusted under 35 U.S.C. 154(b) by 85 days.

(21) Appl. No.: 17/039,747

(22) Filed: Sep. 30, 2020

(65) Prior Publication Data

US 2022/0097027 A1    Mar. 31, 2022

(51) Int. Cl.
| | |
|---|---|
| *B01J 23/46* | (2006.01) |
| *B01J 31/16* | (2006.01) |
| *B01J 21/18* | (2006.01) |
| *B01J 23/887* | (2006.01) |
| *B01J 23/75* | (2006.01) |
| *B01J 35/06* | (2006.01) |
| *B01J 37/08* | (2006.01) |
| *B01J 35/00* | (2006.01) |
| *B82Y 30/00* | (2011.01) |
| *B82Y 40/00* | (2011.01) |
| *C01B 3/04* | (2006.01) |

(52) U.S. Cl.
CPC .......... *B01J 23/468* (2013.01); *B01J 21/185* (2013.01); *B01J 23/462* (2013.01); *B01J 23/75* (2013.01); *B01J 23/8871* (2013.01); *B01J 31/1691* (2013.01); *B01J 35/0033* (2013.01); *B01J 35/06* (2013.01); *B01J 37/08* (2013.01); *B01J 35/006* (2013.01); *B82Y 30/00* (2013.01); *B82Y 40/00* (2013.01); *C01B 3/042* (2013.01)

(58) Field of Classification Search
CPC ...... B01J 23/468; B01J 23/462; B01J 21/185; B01J 23/75; B01J 23/8871; B01J 31/1691; B01J 35/0033; B01J 35/06; B01J 37/08; B01J 35/006; B82Y 30/00; B82Y 40/00; C01B 3/042
USPC ........................................................ 502/326
See application file for complete search history.

(56) References Cited

U.S. PATENT DOCUMENTS

| | | |
|---|---|---|
| 550,223 A | 11/1895 | Griscom |
| 7,507,690 B2 | 3/2009 | Krumpelt et al. |
| 7,550,223 B2 | 6/2009 | Zelenay et al. |
| 8,821,776 B2 | 9/2014 | Caballero Lopez et al. |
| 8,835,343 B2 | 9/2014 | Liu et al. |
| 9,012,344 B2 | 4/2015 | Liu et al. |

(Continued)

FOREIGN PATENT DOCUMENTS

| | | |
|---|---|---|
| CN | 102962036 B | 3/2013 |
| CN | 105854853 A | 8/2016 |

(Continued)

OTHER PUBLICATIONS

Alia, et al., "Activity and Durability of Iridium Nanoparticles in the Oxygen Evolution Reaction", Journal of the Electrochemical Society, 163(11), pp. F3105-F3112 (2016).

(Continued)

*Primary Examiner* — Patricia L. Hailey
(74) *Attorney, Agent, or Firm* — Foley & Lardner LLP

(57) ABSTRACT

Methods for producing a carbon-free, PGM-free support for PGM catalyst. The catalytic material comprises PGM metals disposed on a carbon-free support which is catalytic but free of PGM.

14 Claims, 14 Drawing Sheets

(56) References Cited

U.S. PATENT DOCUMENTS

| | | | |
|---|---|---|---|
| 9,180,443 | B1 | 11/2015 | Serov et al. |
| 9,350,026 | B2 | 5/2016 | Liu et al. |
| 9,825,308 | B1 | 11/2017 | Liu et al. |
| 2003/0145681 | A1 | 8/2003 | El-Shall et al. |
| 2003/0228972 | A1 | 12/2003 | Birss et al. |
| 2004/0204315 | A1 | 10/2004 | Krumpelt et al. |
| 2008/0286490 | A1 | 11/2008 | Bogdanoff et al. |
| 2009/0023828 | A1 | 1/2009 | Yu et al. |
| 2009/0183996 | A1 | 7/2009 | Richter et al. |
| 2010/0043636 | A1 | 2/2010 | Hwang et al. |
| 2010/0285100 | A1 | 11/2010 | Balkus et al. |
| 2011/0124500 | A1 | 5/2011 | Fang et al. |
| 2011/0137025 | A1 | 6/2011 | Yaghi et al. |
| 2011/0143913 | A1 | 6/2011 | Yang et al. |
| 2011/0144365 | A1 | 6/2011 | Park et al. |
| 2011/0294658 | A1 | 12/2011 | Lefevre et al. |
| 2012/0046164 | A1 | 2/2012 | Tanaka et al. |
| 2012/0077667 | A1 | 3/2012 | Liu et al. |
| 2014/0093790 | A1 | 4/2014 | Liu et al. |
| 2014/0099571 | A1 | 4/2014 | Proietti et al. |
| 2015/0180045 | A1 | 6/2015 | Liu et al. |
| 2015/0231622 | A1 | 8/2015 | Kitagawa et al. |
| 2015/0295248 | A1 | 10/2015 | Serov et al. |
| 2015/0340705 | A1 | 11/2015 | Tylus et al. |
| 2015/0380741 | A1 | 12/2015 | Serov et al. |
| 2016/0012927 | A1 | 1/2016 | Nenoff et al. |
| 2016/0211529 | A1 | 7/2016 | Kurungot et al. |
| 2016/0231233 | A1 | 8/2016 | Wang et al. |
| 2016/0248102 | A1 | 8/2016 | Liu et al. |
| 2017/0003272 | A1* | 1/2017 | Kim ..................... B01J 35/0033 |
| 2017/0012277 | A1 | 1/2017 | Wang |
| 2017/0145599 | A1 | 5/2017 | Mu et al. |
| 2019/0060888 | A1 | 2/2019 | Liu et al. |

FOREIGN PATENT DOCUMENTS

| | | | |
|---|---|---|---|
| CN | 106835362 A | 6/2017 | |
| CN | 106865362 B | 6/2017 | |
| CN | 107442125 B | 12/2017 | |
| CN | 109126885 A | 1/2019 | |
| CN | 111477886 A | 7/2020 | |
| DE | 10 2005 053 430 A1 | 5/2007 | |
| JP | 2007-277105 A | 10/2007 | |
| JP | 2012-200674 | * 10/2012 | .............. B01J 37/34 |
| WO | WO-2007/007113 A2 | 1/2007 | |
| WO | WO-2010/051619 A1 | 5/2010 | |
| WO | WO-2015/077039 A1 | 5/2015 | |
| WO | WO-2015/173553 A1 | 11/2015 | |
| WO | WO-2016/000032 A1 | 1/2016 | |

OTHER PUBLICATIONS

Back, et al., "Single-atom catalysts for CO2 electroreduction with significant activity and selectivity improvements," Chemical Science 8(2), pp. 1090-1096 (2017).

Bard & Faulkner, "Electromechanical Methods: Fundamentals and Applications," John Wiley & Sons, Inc. (2011).

Barkholtz, et al., "Enhanced performance of non-PGM catalysts in air operated PEM-fuel cells," International Journal of Hydrogen Energy 41(47), pp. 22598-22604 (2016).

Bernt & Gasteiger, "Influence of Ionomer Content in IrO2/TiO2 Electrodes on PEM Water Electrolyzer Performance," Journal of the Electrochemical Society 163(11), pp. F3179-F3189 (2016).

Carmo, et al., "A comprehensive review on PEM water electrolysis," International Journal of Hydrogen Energy 38(12), pp. 4901-4934 (2013).

Chatti, et al., "Intrinsically stable in situ generated electrocatalyst for long-term oxidation of acidic water at up to 80 C," Nature Catalysis 2, pp. 457-465 (2019).

Chong, et al., "Investigation of Oxygen Reduction Activity of Catalysts Derived from Co and Co/Zn Methyl-Imidazolate Frameworks in Proton Exchange Membrane Fuel Cells," ChemElectroChem 3(10), pp. 1541-1545 (2016).

Danilovic, et al., "(Plenary) Challenges in Going from Laboratory to Megawatt Scale PEM Electrolysis," ECS Transactions 75(14), pp. 395-402 (2016).

Danilovic, et al., "Using Surface Segregation to Design Stable Ru—Ir Oxides for the Oxygen Evolution Reaction in Acidic Environments," Angewandte Chemie 126(51), pp. 14240-14245 (2014).

Dresselhaus & Thomas, "Alternative energy technologies," Nature 414, pp. 332-337 (2001).

Faubert, et al., "Activation and Characterization of Fe-based Catalysts for the Reduction of Oxygen in Polymer Electrolyte Fuel Cells," Electrochimica Acta 43(14-15), pp. 1969-1984 (1998).

Gao, et al., "Atomic layer confined vacancies for atomic-level insights into carbon dioxide electroreduction," Nature Communications 8, 14503, 9 pages (2017).

Gray, "Powering the planet with solar fuel," Nature Chemistry 1, p. 7 (2009).

Hahn, et al., "Engineering Cu surfaces for the electrocatalytic conversion of CO2: Controlling selectivity toward oxygenates and hydrocarbons," Proceedings of the National Academy of Sciences 114(23), pp. 5918-5923 (2017).

Hu, et al., "IrO2/Nb—TiO2 electrocatalyst for oxygen evolution reaction in acidic medium," International Journal of Hydrogen Energy 39(13), pp. 6967-69796 (2014).

Huan, et al., "Electrochemical Reduction of CO2 Catalyzed by Fe—N—C Materials: a Structure-Selectivity Study," ACS Catalysis, 7, pp. 1520-1525 (2017).

Huo, et al., "A versatile, industrially relevant, aqueous room temperature synthesis of HKUST-1 with high space-time yield," Journal of Materials Chemistry A, 1, pp. 15220-15223 (2013).

Hwang, et al., "Perovskites in catalysis and electrocatalysis," Science 358(6364), pp. 751-756 (2017).

Indra, et al., "Unification of Catalytic Water Oxidation and Oxygen Reduction Reactions: Amorphous Beat Crystalline Cobalt Iron Oxides," Journal of the American Chemical Society 136(50), pp. 17530-17536 (2014).

Janiak, et al., "MOFs, MILs and more: concepts, properties and applications for porous coordination networks (PCNs)", New Journal of Chemistry 34(11), pp. 2337-2388 (2010).

Jaouen, et al., "Cross-Laboratory Experimental Study of Non-Noble-Metal Electrocatalysts for the Oxygen Reduction Reaction," ACS Applied Materials & Interfaces 1(8), pp. 1623-1639 (2009).

Jasinski, "A New Fuel Cell Cathode Catalyst", Nature 201, pp. 1212-1213 (1986).

Kanan & Nocera, "In Situ Formation of an Oxygen-Evolving Catalyst in Neutral Water Containing Phosphate and Co2 ," Science 321(5892), pp. 1072-1075 (2008).

Katsounaros, et al., "Oxygen Electrochemistry as a Cornerstone for Sustainable Energy Conversion," Angewandte Chemie 53(1), pp. 102-121 (2014).

Keskin, et al., "Atomically detailed models of gas mixture diffusion through CuBTC membranes," Microporous and Mesoporous Materials 125(1-2), pp. 101-106 (2009).

Kornienko, et al., "Metal-Organic Frameworks for Electrocatalytic Reduction of Carbon Dioxide," Journal of the American Chemical Society 137, pp. 14129-14135 (2015).

Kumar, et al., "Highly selective electrochemical reduction of carbon dioxide using Cu based metal organic framework as an electrocatalyst," Electrochemistry Communications, 25, pp. 70-73 (2012).

Kumar, et al., "New trends in the development of heterogeneous catalysts for electrochemical CO2 reduction," Catalysis Today 270, pp. 19-30 (2016).

Kwon, et al., "Cobalt Assisted Synthesis of IrCu Hollow Octanedral Nanocages as Hignly Active Electrocatalysts toward Oxygen Evolution Reaction," Advanced Functional Materials 27(7), 1604688, 8 pages (2017).

Lee, et al., "Sustainable production of formic acid by electrolytic reduction of gaseous carbon dioxide," Journal of Materials Chemistry A 3(6), pp. 3029-3034 (2015).

Lefevre, et al., "Fe-based Catalysts for the Reduction of Oxygen in Polymer Electrolyte Membrane Fuel Cell Conditions: Determination of the Amount of Peroxide Released During Electroreduction and its Influence on the Stability of the Catalysts," Electrochimica Acta 28, pp. 2749-2760 (2003).

(56) References Cited

OTHER PUBLICATIONS

Lefevre, et al., "Iron-Based Catalysts with Improved Oxygen Reduction Activity in Polymer Electrolyte Fuel Cells," Science 324, pp. 71-74 (2009).
Lux, et al., "Heat-treatment of metal-organic frameworks for green energy applications," CrystEngComm 17, pp. 10-22 (2015).
Ma, et al., "Cobalt Imidazolate Framework as Precursor for Oxygen Reduction Reaction Electrocatalysts," Chemistry: A European Journal 17(7), pp. 2063-2067 (2011).
Ma, et al., "Framework-Catenation Isomerism in Metal-Organic Frameworks and Its Impact on Hydrogen Uptake," Journal of the American Chemistry Society 129, pp. 1858-1859 (2007).
McCrory, et al., "Benchmarking Hydrogen Evolving Reaction and Oxygen Evolving Reaction Electrocatalysts for Solar Water Splitting Devices," Journal of the American Chemical Society 137(13), pp. 4347-4357 (2015).
Mondschein, et al., "Crystalline Cobalt Oxide Films for Sustained Electrocatalytic Oxygen Evolution under Strongly Acidic Conditions," Chemistry of Materials 29(3), pp. 950-957 (2017).
Moreno-Hernandez, et al., "Crystalline nickel manganese antimonate as a stable water-oxidation catalyst in aqueous 1.0 M $H_2SO_4$," Energy & Environmental Science 10(10), pp. 2103-2108 (2017).
Nie, et al., "Selectivity of $CO_2$ Reduction on Copper Electrodes: The Role of the Kinetics of Elementary Steps," Angewandte Chemie 52(9), pp. 2459-2462 (2013).
Nong, et al., "A unique oxygen ligand environment facilitates water oxidation in hole-doped IrNiOx core-shell electrocatalysts," Nature Catalysis 1, pp. 841-851 (2018).
Oh, et al., "Electrochemical Catalyst-Support Effects and Their Stabilizing Role for IrOx Nanoparticle Catalysts during the Oxygen Evolution Reaction," Journal of the American Chemical Society 138(38), pp. 12552-12563 (2016).
Oh, et al., "Oxide-supported Ir nanodendrites with high activity and durability for the oxygen evolution reaction in acid PEM water electrolyzers," Chemical Science 6(6), pp. 3321-3328 (2015).
Oh, et al., "Preparation of Mesoporous Sb-, F-, and In-Doped $SnO_2$ Bulk Powder with High Surface Area for Use as Catalyst Supports in Electrolytic Cells," Advanced Functional Materials 25(7), pp. 1074-1081 (2015).
Park, et al., "Iridium-Based Multimetallic Nanoframe@Nanoframe Structure: An Efficient and Robust Electrocatalyst toward Oxygen Evolution Reaction," ACS Nano 11(6), pp. 5500-5509 (2017).
Pei, et al., "Synthesis and catalysis of chemically reduced metal-metalloid amorphous alloys," Chemical Society Reviews 41(24), pp. 8140-8162 (2012).
Proietti et al., "Iron-based cathode catalyst with enhanced power density in polymer electrolyte membrane fuel cells", Nature Communications 2, 416, 9 pages (2011).
Reier, et al., "Electrocatalytic Oxygen Evolution Reaction in Acidic Environments—Reaction Mechanisms and Catalysts," Advanced Energy Materials 7(1), 1601275, 18 pages (2017).
Rungtaweevoranit, et al., "Copper Nanocrystals Encapsulated in Zr-based Metal-Organic Frameworks for Highly Selective $CO_2$ Hydrogenation to Methanol," Nano Letters 16(12), pp. 7645-7649 (2016).
Sardar, et al., "Water-Splitting Electrocatalysis in Acid Conditions Using Ruthenate-Iridate Pyrochlore," Angewandte Chemie 126(41), pp. 11140-11144 (2014).
Seitz, et al., "A highly active and stable IrOx/$SrIrO_3$ catalyst for the oxygen evolution reaction," Science 353(6303), pp. 1011-1014 (2016).
Serov, et al., "Templated bi-metallic non-PGM catalysts for oxygen reduction," Electrochimica Acta 80, pp. 213-218 (2012).
Serov, et al., "Tri-metallic transition metal-nitrogen-carbon catalysts derived by sacrificial support method synthesis," Electrochimica Acta 109, pp. 433-439 (2013).
Shan, et al., "Charge-Redistribution-Enhanced Nanocrystalline Ru@IrOx Electrocatalysts for Oxygen Evolution in Acidic Media," Chem 5(2), pp. 445-459 (2019).
Smith, et al., "Photochemical Route for Accessing Amorphous Metal Oxide Materials for Water Oxidation Catalysis," Science 340(6128), pp. 60-63 (2013).
Studt, et al., "Discovery of a Ni—Ga catalyst for carbon dioxide reduction to methanol," Nature Chemistry 6, pp. 320-324 (2014).
Suen, et al., "Electrocatalysis for the oxygen evolution reaction: recent development and future perspectives," Chemical Society Reviews 46(2), pp. 337-365 (2017).
Sun, et al., "Catalytic Hydrolysis of Ammonia Borane via Cobalt Palladium Nanoparticles," ACS Nano 5(8), pp. 6458-6464 (2011).
Van Veen, "Oxygen Reduction on Monomeric Transition Metal Phthalocyanines in Acid Electrolyte," Electrochimica Acta 21, pp. 921-928 (1979).
Wang, et al., "Improving the activity and stability of Ir catalysts for PEM electrolyzer anodes by $SnO_2$:Sb aerogel supports: does V addition play an active role in electrocatalysis?," Journal of Materials Chemistry A 5(7), pp. 3172-3178 (2017).
Wu, et al., "Polyaniline-Derived Non-Precious Catalyst for the Polymer Electrolyte Fuel Cell Cathode," ECS Transactions 16(2), pp. 159-170 (2008).
Yi, et al., "Hollow Metallic Microspheres: Fabrication and Characterization," The Journal of Physical Chemistry C 113(4), pp. 1222-1226 (2009).
Yue, et al., "Template-Free Synthesis of Hierarchical Porous Metal-Organic Frameworks," Journal of the American Chemical Society 135(26), pp. 9572-9575 (2013).
Zhang, et al., "Honeycomb-like mesoporous nitrogen-doped carbon supported Pt catalyst for methanol electrooxidation," Carbon 93, pp. 1050-1058 (2015).
Zhao, et al., "Highly Efficient Non-Precious Metal Electrocatalysts Prepared from One-Pot Synthesized Zeolitic Imidazolate Frameworks," Advanced Materials 26(7), pp. 1093-1097 (2014).
Zhao, et al., "Iron imidazolate framework as precursor for electrocatalysts in polymer electrolyte membrane fuel cells," Chemical Science 3(11), pp. 3200-3205 (2012).
Chen, et al., "Bimetallic metal-organic framework-derived carbon nanocubes as efficient electrocatalysts for oxygen evolution reaction," Journal of Solid State Chemistry 291, 121679, 6 pages (2020).
Liang, et al., "Non-noble trimetallic Cu—Ni—Co nanoparticles supported on metal-organic frameworks as highly efficient catalysts for hydrolysis of ammonia borane," Journal of Alloys and Compounds 741, pp. 501-508 (2018).
Senthil Raja, et al., "Composition-balanced trimetallic MOFs as ultra-efficient electrocatalysts for oxygen evolution reaction at high current densities," Applied Catalysis B: Environmental 279, 119375, 14 pages (2020).
Tan, et al., "Construction of hierarchical trimetallic organic framework leaf-like nanostructures derived from carbon nanotubes for gas-sensing applications," Journal of Hazardous Materials 400, 123155, 9 pages (2020).
Ayers, et al., "Perspectives on Low-Temperature Electrolysis and Potential for Renewable Hydrogen at Scale," Annual Review of Chemical and Biomolecular Engineering 10, pp. 219-239 (2019).
Huynh, et al., "A Functionally Stable Manganese Oxide Oxygen Evolution Catalyst in Acid," Journal of the American Chemical Society 136(16), pp. 6002-6010 (2014).
Meng, et al., "Strain Regulation to Optimize the Acidic Water Oxidation Performance of Atomic-Layer IrOx," Advanced Materials 31(37), 1903616, 8 pages (2019).

\* cited by examiner

CATALYST FOR WATER SPLITTING

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to catalysts, specifically for catalysts active for water splitting in hydrogen and oxygen production, such as in a proton-exchange membrane ("PEM") fuel cell.

BACKGROUND

Hydrogen has been considered one of the most promising energy carriers as it can be burned to generate heat or reacted with air in fuel cells to generate electricity with water as the only byproduct. However, hydrogen does not exist purely in nature, and its production relies on energy input. Therefore, the viability of hydrogen-based energy generation is very much dependent on the efficiency of the mechanisms available to produce hydrogen as a feedstock. Water electrolysis, combined with renewable electric power, to produce hydrogen is expected to emerge as a low-emission and sustainable generation technology. Compared with the two-electron hydrogen evolution reaction ("HER") proceeding at the cathode side of water electrolysis, the four-electron anodic oxygen evolution reaction ("OER") is more sluggish, which dominates the applied potential for the overall water splitting.

Among the means of hydrogen production, low temperature water electrolysis represents one of the critical technologies as it produces clean hydrogen with quick response and excellent integration with the renewable sources. Low temperature electrolysis can be operated by using either proton exchange (acidic) or anion exchange (alkaline) membranes. The low temperature membrane electrolyzers offer advantages of higher current density (above 2 A/cm$^{-2}$) and higher H$_2$ purity, rendering them a preferred technology when high energy efficiency and low footprint are essential (see, e.g., Carmo, et al., "A comprehensive review on PEM water electrolysis," International Journal of Hydrogen Energy 38(12), pp. 4901-4934 (2013)).

Water electrolyzer can operate using either alkaline or acidic membranes. For alkaline electrolyzer, the electrochemical reactions anode and cathode are the following:

Anode: $2OH^- \rightarrow \frac{1}{2}O_2 + H_2O + 2e^-$ (1)

Cathode: $2H_2O + 2e^- \rightarrow H_2 + 2OH^-$ (2)

For acidic or proton exchange membrane electrolyzer, the electrochemical reactions anode and cathode are the following;

Anode: $H_2O \rightarrow 2H^+ + \frac{1}{2}O_2 + 2e^-$ (3)

Cathode: $2H^+ + 2e^- \rightarrow H_2$ (4)

Particularly at anode where the OER takes place, working in the oxidative environment under high polarization voltage, however, adds substantial demand to the electrode catalyst and the support. The situation is even worse when the reaction occurs in corrosive acidic media, resulting in limited choice of materials that would perform under such harsh conditions.

In order to operate in such an environment and provide acceptable levels of performance a new catalytic material is needed.

SUMMARY

Embodiments described herein relate generally to a method of creating a nanofiber catalyst comprising preparing a platinum group metal-free metal organic framework material comprising MOF crystals; forming a mixture of MOF crystals suspended in a polymer solution; electrospinning the MOF crystals and polymer mixture, forming porous and interconnected nanofibers having MOF crystals uniformly dispersed; subjecting the metal organic framework containing porous nanofiber to a first heat treatment forming carbon-based nanofibers with high surface area; depositing a platinum group metal on the carbon-based nanofibers forming a platinum group metal on nanofiber structure; and annealing the platinum group metal on nanofiber structure, removing carbon and forming a PGM catalyst on a non-PGM metal oxide, carbon-free catalytict support.

Embodiments described herein also relate generally to a nanofiber catalyst comprising a noncarbon, PGM-free transition metal oxide fibrous material having a plurality of pores, the transition metal oxide particles inter-connected and fused together in a nanofibrous network; and a plurality of platinum group metal particles disposed on the transition metal oxide particles.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
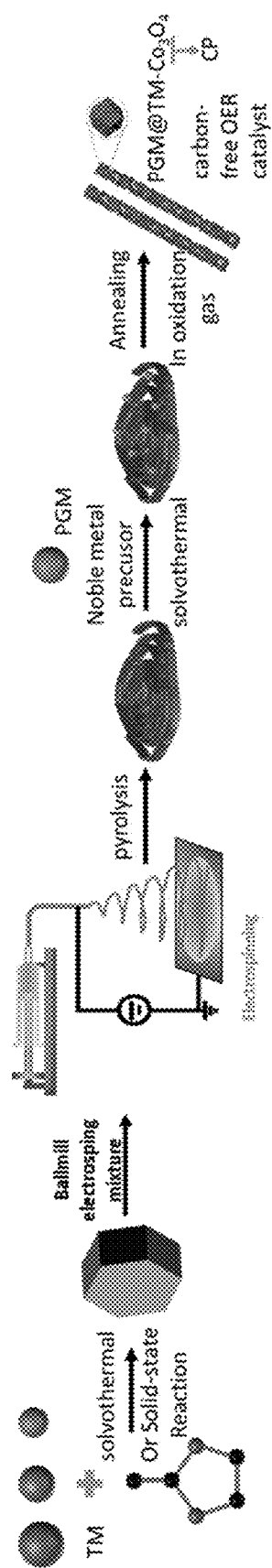
FIG. 1 depicts the synthesis process of IrO$_x$@LLCP (where "LLCP" is La and Li co-doped Co$_3$O$_4$ carbon fiber paper or "CP") and RuO$_x$@LLCP OER catalyst. The spheres indicate (from left to right) lanthanide, cobalt, transition metal, and noble metal elements.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to an electrolyzer for water splitting in hydrogen production. U.S. Pat. No. 9,350,026 and U.S. Pat. App. Pub. No. 2019/0060888 describe certain nanofibrous catalysts and PGM-free OER catalysts synthesized either from the monometallic, bimetallic, and trimetallic MOFs containing transition metals (e.g., cobalt, iron, manganese, zirconium, molybdenum, tantalum tungsten yttrium and niobium) and lanthanide (e.g., lanthanum, cerium, gadolinium) as the metal center or "secondary building units" ("SBUs") coordinated by nitrogen containing or carboxylic ligands; or by infiltrating soluble transition metal or lanthanide compounds into such MOFs the contents of both are hereby incorporated by reference.

Embodiments described herein relate generally to a synergistic OER catalyst that includes PGM-free catalyst as support and a PGM catalyst. It is believed that the process enhances the activity and stability of Ru- and Ir-based eletrocatalysts simultaneously by taking advantage of charge redistribution across metal-metal oxide heterojunction. In one embodiment, a PGM-free OER catalyst is derived from a transition metal doped metal-organic-framework ("MOF") possessing a hollow MOF structure, a high Brunar-Emmett-Teller surface area, and a densely populated, dispersed active site accessible to electrolytes. In exemplary embodiments, the OER catalyst has a core-shell structure of IrCo@IrO$_x$/LLCP and Ru@RuO$_x$/LLCP with amorphous precious metal as core and partial oxide precious metal as shell, precious metal-free oxide as support. It is believed that the core/shell, or partial shell, structure is the result of the surface of the noble metal or noble bi-metal/alloy exposed to the air during the milled annealing process resulting in the partial oxidation of the surface.

Compared with the alkaline and neutral counterparts, PEM water electrolyzers ("PEMWE") possess more appealing metrics, attributable to its speed, higher purity, and high current density for hydrogen generation. However, the scarcity and cost of Ir and Ru, especially Ir (which is extremely scarce with tenfold smaller abundance than platinum), has obstructed the substantial market penetration of PEMWE. Therefore, to enable the application of Ir and Ru as OER electrocatalysts on larger scale, minimizing their usage with improved activity and stability thus reducing cost at improved system efficiency is critical but also a challenge for PEM electrolyzers. Tremendous effort has been dedicated to develop improved Ir/Ru-bearing anodic catalysts by vast of materials design strategies, such as well-defined extend surface of thin-film model systems, lattice strain engineering, and alloy-based catalysts with skeleton or nano-porous surface or core-shell structure and hollow particles, including nanoframes, and nanocage.

An alternative way is to develop advanced catalyst supports with good corrosion resistance, electron conductivity, and strong interaction with catalyst nanoparticle. The mutual compensation between PGM-free catalysts and PGM catalysts, namely synergistic effects, has the potential to reduce PGM usage while maintain the excellent activity and durability for the integrity. It's known that amorphous materials with a large amount of randomly oriented bonds possessing abundant defects and coordination unsaturated site on the surface, enable superior catalytic performance than its crystalline counterparts.

As described further below, certain embodiments utilize a MOF for the formation of a PGM-free catalyst, which may then be used together with low concentrations of PGMs to form a catalytic material. Unlike prior uses of MOFs for PGM-free catalysts, certain embodiments utilize the MOF as a template rather than integrating it into the PGM-free catalyst itself, thus allowing the catalyst to use the MOF's porous structure as a template and enabling the introduction of transition metals that are not part of the MOF's structure. This is not limited by the requirement for the transition metal ("TM") (e.g., iron, manganese, zirconium, molybdenum, tantalum, tungsten yttrium niobium, lanthanum, cerium, and gadolinium) to be compatible with the MOF itself, allowing the MOF template to utilize two different alien metal element each time, aiming at tuning the electronic configuration of Co in the thus formed cobalt oxide. Further, as the MOF serves as a template, rather than metal or alloy or oxide particle with perfect crystalline structure observed with prior processes, some embodiments described herein facilitate a formation of mixed amorphous structure and crystal structure with large amount of defect, which endow this new material with high OER activity and stability in acid.

In one embodiment, catalysts contain ultra-low concentration (e.g., 6-12 wt %, inclusive) of a platinum group catalyst material, such as Ir or Ru, supported over PGM-free OER catalyst, denoted as IrCo@IrO$_x$/LLCP and Ru@RuO$_x$/LLCP, respectively. High porosity, surface area, riched edges, and more unsaturated binding bond are all believed to facilitate the improvement of catalytic activity of a catalyst. In one embodiment, the PGM-free catalyst has a porous structure with a surface area of about 100 m$^2$/g. Certain processes for such are described in U.S. Pat. App. Pub. No. 2019/0060888, incorporated herein by reference. The resulting catalysts (PGM over PGM-free) have very low overpotential of 240 mV and 190 mV, and very high mass activity at 300 mV overpotential measured by rotating disk electrode ("RDE") in 0.1M HClO$_4$ for Ir and Ru, respectively. With 95% internal resistance correction, the two electrodes research 400 mAcm$^{-2}$ at very low potential of ~1.5V vs. reversible hydrogen electrode ("RHE"), outperforming commercial Ir black.

A PGM-free OER catalyst has also been described in U.S. Pat. App. Pub. No. 2019/0060888. In general, preparing a MOF material includes the steps of forming a mixture of MOF crystals suspended in a polymer solution; electrospinning the MOF crystals and polymer mixture, forming porous and interconnected nanofibers having MOF crystals uniformly dispersed; subjecting the metal organic framework containing porous nanofiber to sequential thermolysis, forming catalytic nanofibers with uniformly distributed catalytic sites; wherein the catalytic nanofibers are catalytic for the oxygen evolution reaction for water splitting in either alkaline or acidic aqueous media.

One embodiment of a PGM-free OER catalyst is derived from La and Mn co-doped Co-MOF ("LaMnCoMOF"). It possesses high surface area, densely distributed active sites, high porosity, and excellent OER performance in terms of high activity and stability under PEMWE. In another embodiment of a PGM-free OER catalyst, a La and Li co-doped CoMOF (e.g., cobalt zeolitic methylimidazolate framework or "LaLiCoMOF") is utilized. The LaMnCoMOF/LaLiCoMOF are fabricated into fiber, followed by thermal activation such as sequential thermolysis. The first thermal activation step is to convert the MOF into carbon that is doped such as with one or more of with Co, La and Mn/Li, and yet keeps the MOF structure as well as maintains the high surface present in the MOF structure prior to the second thermal activation.

Figure 24:
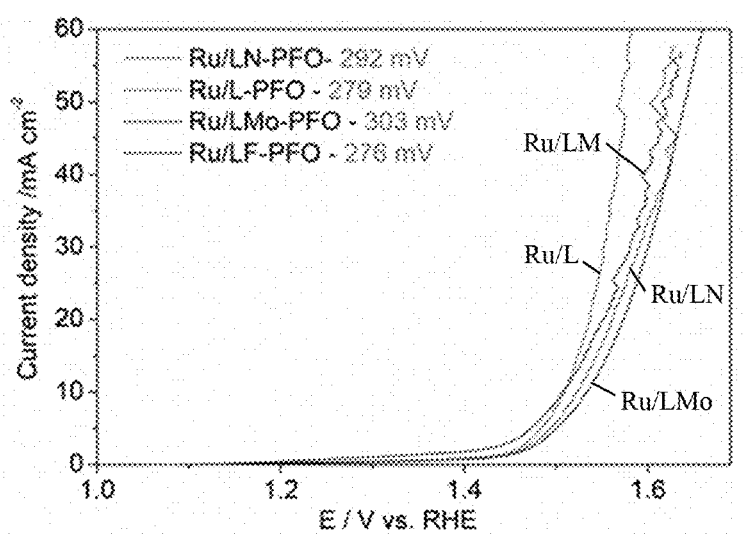
FIG. 24 shows test results under acid.

In the La and Mn co-doped carbon fiber paper ("LMCP") PGM-free catalyst derived from LaMnCoMOF-containing nanofiber, the Mn is the substitution of Co$^{3+}$ to tune the electronic configuration of Co into cobalt oxide and induce the formation of oxygen vacancy. In the LLCP, PGM-free catalyst derived from LaLiCoMOF-containing nanofiber, the Li is inserted into the lattice space of cobalt oxide, forming interstitial solid solution thus inducing Co defect. Alternative embodiments may utilize La+Ni, Fe, Mo, as well as La alone; example results are shown in FIG. 24.

In some embodiments, La and Li co-doped Co-containing zeolitic imidazolate framework ("ZIF") is utilized as a precursor, which can be further fabricated into fiber and thermally activated followed by catalyzing with Ir or Ru to form an advanced structure including amorphous hybrid Ir or Ru phases and unsaturated site-riched PGM-free catalysts. In one embodiment, the Ir or Ru was subsequently in-situ reduced over the obtained carbonized (thermal activation-treated Co-, La-, and Li-doped carbon) material through hydro-thermal method. To avoid MOF dissolving into the organic solution that is used for the reduction of Ir or Ru and to maintain the high surface of MOF structure so that the reduced Ir or Ru can be uniformly dispersed over, in some embodiments, it is necessary to first convert the MOF into a carbon-based material. The heat-treated Co-, La-, and Li-doped carbon material possesses high surface area, enables the uniform distribution of Ir and Ru. In the first pyrolysis process, the LaLiCoMOF-containing nanofiber was subjected to heat treatment at 300-900° C. under inert gas (e.g., Ar, N$_2$) to obtain the Co-, La-, and Li-doped carbon.

In a following reduction step hydrothermal or solvothermal step, Ir or Ru is in-situ reduced over the thus obtained carbon, such as in an oil bath through a hydro-thermal method. An organic surfactant (e.g., glyoxal, glucose, TWEEN80) and a reduction agent (e.g., such as Benzyl alcohol, salicylic acid, or oleylamine) may be used for the reduction of Ir or Ru.

After the reduction step, another heat treatment is applied, such as annealing. The annealing may be at 250-500° C., such as 360° C., and under a gas environment, such as flowing air, to obtain the final catalyst. The synthesis process is illustrated in FIG. 1.

The synthesis results in the formation of an ultra-low concentration of amorphous hybrid structured Ir/IrO$_x$ or Ru/RuO$_x$ precious metal catalyst combined with high porous precious metal free OER active oxide support for highly efficient and stable OER catalysts in acidic medium. In one embodiment, the PGM material has, at least in part, an amorphous metal oxide structure. In some embodiments, the Ir or Ru are present in a a mixture of amorphous and crystal. The current characterizations depict a metal domination, which is believed due to having only partial surface oxidized due to the exposure to the air during the second annealing process under flowing air.

As described, rather than using the MOF directly as a support, the obtained MOF-containing nanofiber was subjected to mild pyrolysis process under inert gas. This pyrolysis stabilized the MOF structure with the transition metal and cobalt uniformly dispersed and linked with carbon. As can be seen in the experimental results, the hydrogen in the initial MOF structure was gone during this step, leaving the metal linked with carbon behind maintaining the MOF structure. The next step is to in-situ reduce Ir and Ru from the corresponding precursor by using organic surfactant and reduction agent in an oil bath. Finally, the obtained material was subjected to gentle annealing process in air. At this step, the carbon was completely burned out. Additionally, at this step, the carbon-burnt benefits the formation of amorphous structured Ir or Ru and helps maintain their metal nature, allowing only the exposed surface being oxidized.

Thus, the catalyst material formed pursuant to methods described herein includes a support, such as for PGMs, that is itself both PGM-free and carbon-free, rather than being a carbonaceous MOF support or a PGM-containing support as previously described. Results show that Ir atoms dispersed over the LLCP support prefer to bonded with adjacent Co atoms to form Ir-incorporated structure, while Ru atoms prefer to be segregated.

The superior electro-catalytic performance of $IrO_x$@LLCP and $RuO_x$@LLCP to their corresponding counterparts can be attribute to several factors. First, the flexible amorphous hybrid structure of the synthesized Ir and Ru possess abundant unsaturated sites with oxygen and structure flexibility. It is believed that the carbon and nitrogen burning process during the second heat treatment effectively form a redox environment for the reduced Ir or Ru, maintaining their metal dominating nature, only allow the surface being partially oxidized to oxide; and the redox environment created by C and N of the MOF benefit the defect formation on the surface of the metal oxide; the applied low temperature for the second heat treatment under flowing air successfully avoid the crystal growth; the intimate interaction between Ir/Ru and PGM-free metal oxide enables an effective tuning of the electronic configuration of Ir and Ru, also helps with the formation of the Ir and Ru unsaturated sites/defects. Second, the high surface area high porous structured LLCP support enables the uniform dispersion of the ultra-low noble metal content. Third, the support itself is OER active comparable to that of low loading Ir black. Embodiments described herein demonstrate a success integration of PGM-free OER catalyst as support for PGM OER catalyst. Their unique structure supports a 2-3 times higher Ir/Ru mass activity than that of the state-of-art $IrO_x$ and an excellent electrochemical durability for 20,000 cycles during OER AST testing. The new catalyst also displayed excellent performance under operating PEMWE cell, outperforming $IrO_x$ even at 1/6 precious metal loading of that used for $IrO_x$.

Thanks to the flexible and advanced structure, the new OER catalysts offer an overpotential of 240 mV and 190 mV for $IrO_x$@LLCP and $RuO_x$@LLCP, respectively, to deliver anodic current density of 10 $mAcm^{-2}$ in 0.1 M $HClO_4$ aqueous electrolyte. Most importantly, the new catalysts were integrated into membrane electrode assembly ("MEA") and demonstrated excellent water splitting performance better than commercial Ir black at precious metal loading of 1/6-1/10 of the commercial Ir black under operating PEM electrolyzer single cell.

Experimental Examples

Example embodiments of Ir and Ru catalysts as described herein where synthesized and tested. Taking advantage of the synergistic effect between noble metal and noble metal-free catalyst, the new catalysts demonstrated high efficient OER catalytic activities with 1400 $A \cdot g_{Ru}^{-1}$ and 860 $A \cdot g_{Ir}^{-1}$ at 300 mV overpotential. This represents activity enhancement by a factor of ~20 relative to the state-of-the-art $IrO_x$ catalyst, as well as excellent durability after 20,000 cycles in 0.1M $HClO_4$ aqueous electrolyte. The two catalysts were also integrated into MEAs and demonstrated outstanding water splitting activity at ultra-low Ir and Ru loading, superior to Ir black. XRD combined with XPS and HRTEM revealed a flexible structure enable Ir or Ru-bearing phase in form of active phase toward OER and the unsaturated coordination-rich structure in both noble metal part and noble metal free part facilitate the attacking of water molecular, electron transfer, thus an unprecedented water splitting performance for PEMWE.

Materials and Methods.

Chemicals. Cobalt (II) nitrate hexahydrate ($Co(NO_3)_2 \cdot 6H_2O$, 98.5%), iridium (III) trichloride hydrate ($IrCl_3 \cdot H_2O$, 99.9%, metals basis), ethanol ($C_2H_5OH$, >99.7%), Benzyl alcohol ($C_7H_8O$, Analytical Pure), glyoxal ("GO," $C_2H_2O_2$, 40% aqueous solution, Chemical Pure), and Nafion solution (5 wt %) were purchased from Aldrich Chemical. Oridium (IV) oxide ($IrO_x$, 99.9%) was purchased from TKK. All the chemicals were used as purchased without further purification. The water used in all experiments was deionized water ("DIW").

Synthesis of $Co(mlm)_2$ MOF and Li and La co-doped Co-MOF. In a typical procedure for $Co(mlm)_2$ preparation, for example $Co(NO_3)_2 \cdot 6H_2O$ (1 g) (Sigma-Aldrich), was dissolved in 50 mL of methanol, followed by addition of a 2-methylimidazole (2.5 g) (Sigma-Aldrich) methanoldic solution (100 mL). The mixture was stirred at room temperature for 20 minutes to give a heterogeneous violet mixture which was then sealed and kept at room temperature for 12 hours. The violet crystals were collected by centrifugation, washed with methanol 3 times, and dried under vacuum at 60° C. overnight.

Preparation of Li and La co-doped Co-MOF-based fiber. Polyvinylpyrrolidone (molecular weight 150,000), polyacrylonitrile (molecular weight 150,000), or poly(methyl methacrylate) (molecular weight 15,000) were dissolved in dimethylformamide ("DMF") at concentrations of 100 $mg \cdot mL^{-1}$, 75 $mg \cdot mL^{-1}$, and 50 $mg \cdot mL^{-1}$, respectively, at 60° C. Li and La co-doped Co-MOF was added into DMF at concentration of 100~200 $mg \cdot mL^{-1}$ and was ball-milled at 400~600 rpm for 6~9 hours with 5 mm stainless steel balls in a planetary ball mill. As one representative composition, polymer solution, and MOF slurry were mixed with the volume ratio of 5:1~1:1. The mixture was then mixed again by ball milling with 3 mm stainless steel at 500 rpm for 0.5~3 hours to make the final precursor solution. The precursor solution was electrospun to form the polymeric nanofibers.

Preparation of LLCP and CP. In a typical preparation for PGM-free catalyst, 200 mg of nanofiber was loaded in a tube furnace, purging with oxidation gas, such as Air, or $O_2$, for 0.5~1 hours. Then the material was heat treated in a rang of 250~500° C. for 1~6 hours with a heating rate of 3~10° C./min in an oxidation atmosphere, such as Air or $O_2$, at a flow rate of 100 mL/min.

Preparation of carbon nanofiber with or without TM dopants (from outside the MOF). In a typical preparation for carbon template, 200 mg of nanofiber was loaded in a tube furnace, purging with Ar gas for 1~2 hours. Then the material was heat treated in a rang of 300~900° C. for 3~9 hours with heating rate of 3~10° C./min in an inert atmosphere, such as Ar or $N_2$) at a flow rate of 100 mL/min. The obtained carbon, named as TM-carbon fiber, or carbon fiber, was used directly in the following steps.

Preparation of $IrO_x$ over LL-carbon fiber, $RuO_x$ over LL-carbon fiber, $IrO_x$ over carbon fiber, and $RuO_x$ over carbon fiber. In a typical preparation precursor, take $IrO_x$ over LL-carbon fiber as example, $IrCl_3$ (5~10 mg), CA (20~50 mg), GO (0.1~0.6 mL) and the carbon derived from LaLi co-doped Co-MOF based nanofiber (100~400 mg) mixed in 4~12 mL benzyl alcohol were added into a vial. After the vial had been capped, the mixture was ultrasonicated for 1~2 hours. The resulting homogeneous mixture was then heated at >160° C. for 6~14 hours in an oil bath before it was cooled to room temperature. The resulting colloidal product was collected by centrifugation and washed three times with an ethanol/acetone mixture. The procedure for the preparation of $RuO_x$ over LL-carbon fiber was the same to that of $IrO_x$ over LL-carbon fiber, except for replacing $IrCl_3$ with Ru (III) trichloride. The preparation of IrO$_x$ over carbon fiber and RuO$_x$ over carbon fiber were the same as that of IrO$_x$ over LL-carbon fiber and RuO$_x$ over LL-carbon fiber, except for replacing LL-carbon fiber with carbon fiber.

Preparation of IrO$_x$@LLCP, RuO$_x$@LLCP, IrO$_x$@CP, and RuO$_x$@CP. In a typical preparation, for example IrO$_x$@LLCP, 200 mg of IrO$_x$-over-LL-carbon nanofiber was loaded in a tube furnace, purging with oxidation gas, such as air or O$_2$, for 0.5~1 hour. Then the material was heat treated in a rang of 250~500° C. for 1~6 hours with a heating rate of 3~10° C./min in an oxidation atmosphere, such as air or O$_2$, at a flow rate of 100 mL/min. The preparations of RuO$_x$@LLCP, IrO$_x$@CP, and RuO$_x$@CP were conducted with the same annealing process as that used for IrO$_x$@LLCP.

Characterization. The powder XRD patterns of samples were conducted on Bruker Diffractometer D8 Advance operating at a voltage of 40 kV and a current of 15 mA with Cu Kα radiation (λ=1.5406 Å). The surface composition and the Co, Ir, Ru, and O oxidation state on the surface of the catalyst were accessed by XPS. XPS measurements were performed by a Kratos AXIS-165 surface analysis system and the spectra were collected with a monochromatic Al Ka source. The binding energies of XPS spectral range were calibrated for specimen charging effects using the C 1s level at the energy of 284.6 eV as a reference. All the XPS spectra were fitted and analyzed using XPSPEAK software with a Gaussiane-Lorentzian function and a nonlinear Shirley background. The catalyst morphologies and microstructures were characterized by TEM and HRTEM using Argonne Chromatic Aberration-Corrected ("ACAT") TEM operated at 80 kV. High-angle annular dark-field scanning transmission electron microscopy ("HAADF-STEM") and EDS images were taken on FEI Talos TEM with 200 kV accelerate voltage.

Electrochemical Tests. Electrochemical experiments were performed in a three-compartment glass cell with a RDE (5 mm in diameter of golden disk, Pine Instrument) and a potentiostat (Biologic) at room temperature. A gold wire and a Hg/Hg$_2$SO$_4$ electrode (saturated K$_2$SO$_4$) were used as counter electrode and reference electrode, respectively. All electrochemical measurements were carried out in O$_2$-saturated either 0.1M HClO$_4$ or 0.5M H$_2$SO$_4$. The inks were prepared by mixing the catalyst powder with Nafion ionomer (0.5 wt % Nafion dissolved in methanol) solution. The mixture was sonicated for 2 hours before being applied onto the golden disk. After solvent evaporation from coated ink naturally, a thin layer of Nafion-catalyst remained on the golden disk surface. The amount of catalysts was calculated in order to get the final film on golden disk electrode containing 10~12 μg$_{Ir}$·cm$^{-2}$ and 10~16 μg$_{Ru}$·cm$^{-2}$. All potentials reported in this paper were normalized with respect to the RHE. Linear sweep voltammetry ("LSV") is employed to obtain polarization curves of all the as-synthesized samples. Before the LSV measurement, the catalyst was subjected to a number of cyclic voltammetry ("CV") cycles at a scan rate of 100 mV/s$^{-1}$ until a stable CV curve was obtained. All the LSV data were measured at a scan rate of 10 mV/s$^{-1}$ and corrected with 95% iR-compensation. The long-term catalytic stability was recorded by a chronopotentiometry measurement at a constant j of 10 mAcm$^{-2}$. The Tafel plots were derived from the OER LSV curves and calculated based on the equation η=b log j+a, where b and j are the Tafel slope and current density, respectively. The electrochemical active surface areas were determined by taking CV measurement in the potential windows of 0.9-1.0V versus RHE under different scan rates ranging from 20-100 mV/s$^{-1}$ with an interval point of 20 mV/s$^{-1}$. The double layer capacitance ("C$_{dl}$") was calculated by plotting the charge current density differences (=j$_{anodic}$-j$_{cathodic}$) at 0.95V versus RHE against the scan rate. The slope of the fitting line is equal to twice of the C$_{dl}$. Electrochemical impedance spectroscopy was measured at an overpotential of 300 mV from 0.1 Hz to 100 KHz with an amplitude of 10 mV.

MEA test in PEMWE single cell. MEA with the synthesized catalysts as anode were prepared using Nafion 115 membrane by the catalyst coated membrane ("CCM") method. A commercial Pt/C (46 wt %, TKK) was used as the cathode. Catalyst inks were prepared by ultrasonically mixing 5 wt % Nafion ionomer in isopropanol ("IPA"), and then they were sprayed directly onto the membrane with a 5 cm$^2$ geometric area. The polarization curves were measured at 60° C. and atmospheric pressure. DIW was pumped using a peristaltic pump to the anode side, which was pre-heated to the 60° C. by heating circulator.

The electrochemical surface area ("ESCA") was estimated from the electrochemical C$_{dl}$ of the catalytic surface. The C$_{dl}$ was determined by measuring the non-Faradaic capacitive current charging from the scan rates dependence of cyclic voltammograms. The C$_{dl}$ is obtained from the charge current ("ic") as function of the scan rate (v), which is equal to the slope based on Eq. (5) shown as follows:

$$C_{dl}=ic/v(1) \qquad (5)$$

ESCA is calculated using Eq. (6), whereas the specific capacitance (C$_s$) is 0.035 mF/cm$^{-2}$ in 0.1M HClO$_4$ aqueous solution:

$$ECSA=C_{dl}/C_s \times m_{catalyst} \qquad (6)$$

Experimental Results and Analysis.

Figure 2:
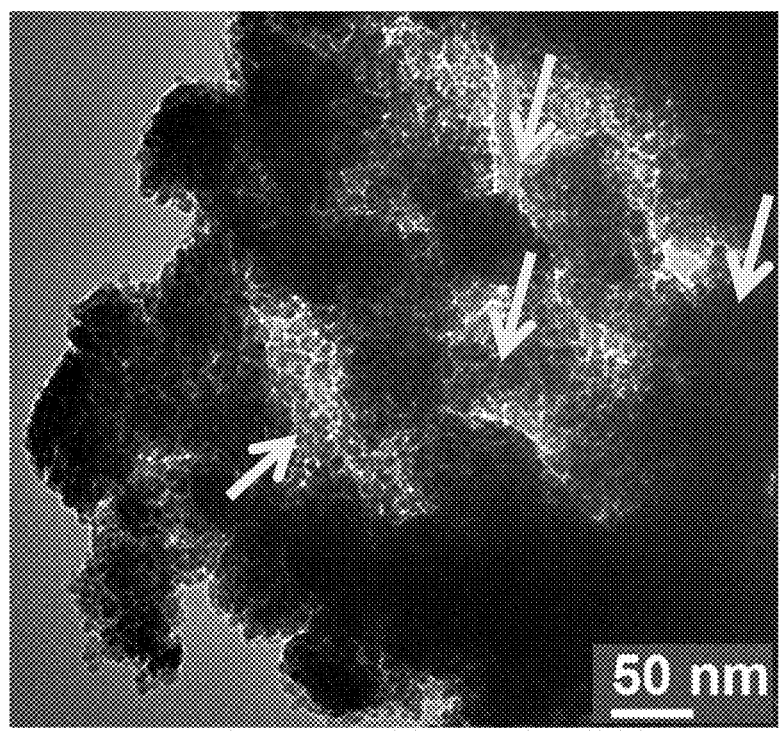
FIG. 2 shows a transmission electron microscopy ("TEM") image of RuO$_x$@LLCP.
Figure 3:
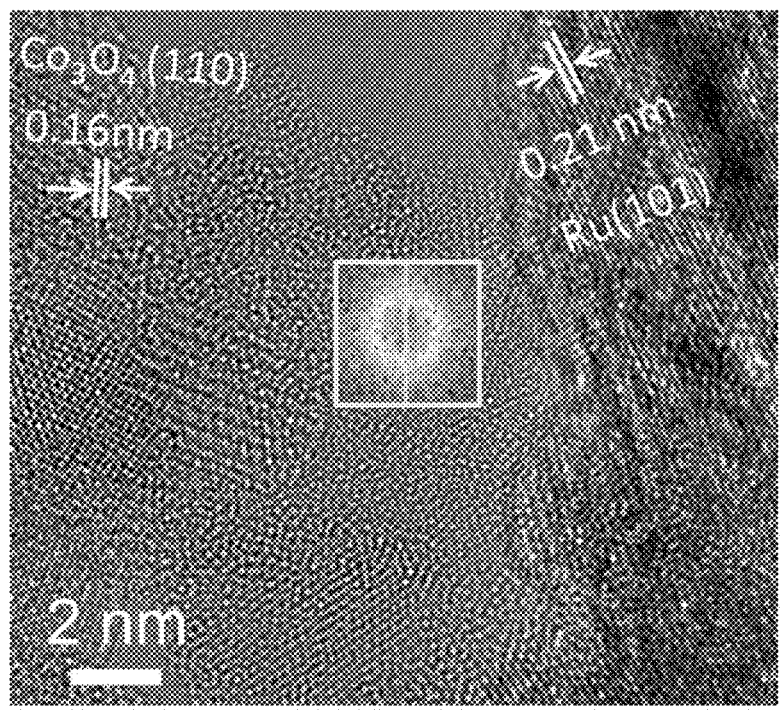
FIG. 3 shows a high-resolution TEM ("HRTEM") image and the corresponding fast Fourier transform ("FFT") patterns of RuO$_x$@LLCP (highlighted area).
Figure 4:
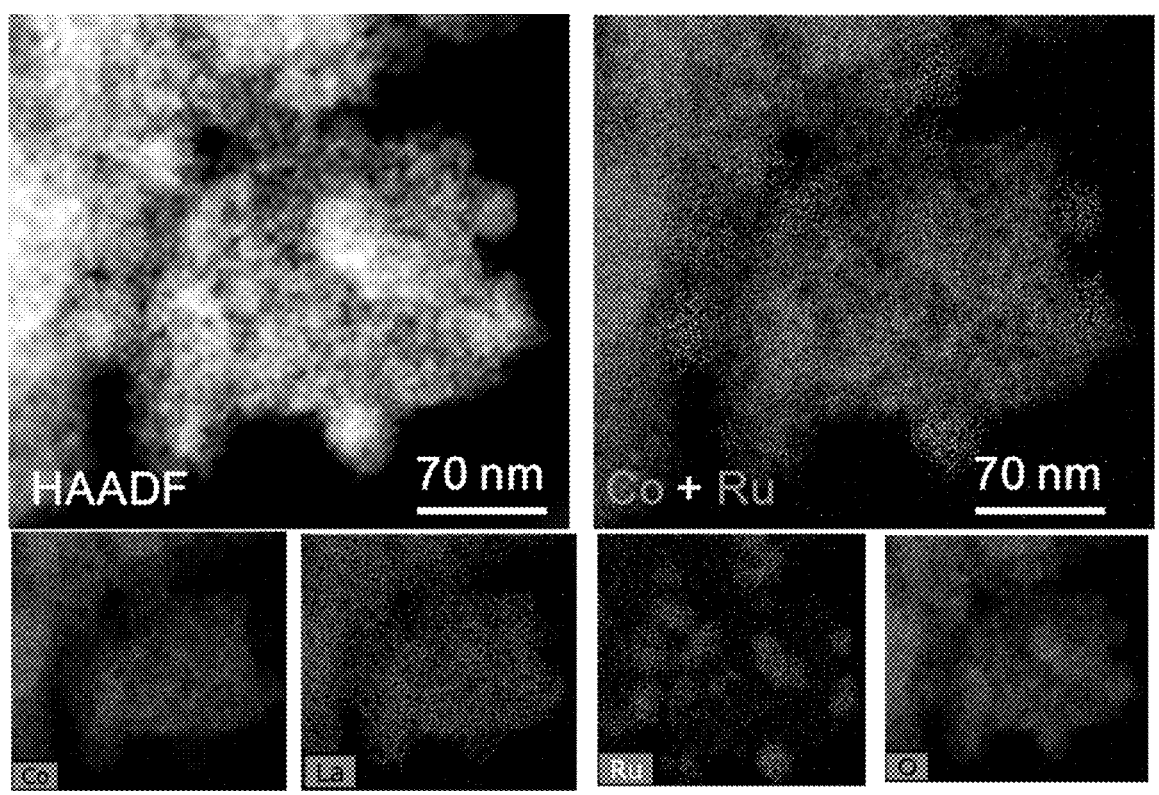
FIG. 4 shows high-angle-annular-dark-field ("HAADF") mode scanning transmission electron microscopy ("STEM") images of RuO$_x$@LLCP and the related energy dispersive spectroscopy ("EDS") mapping images.
Figure 9:
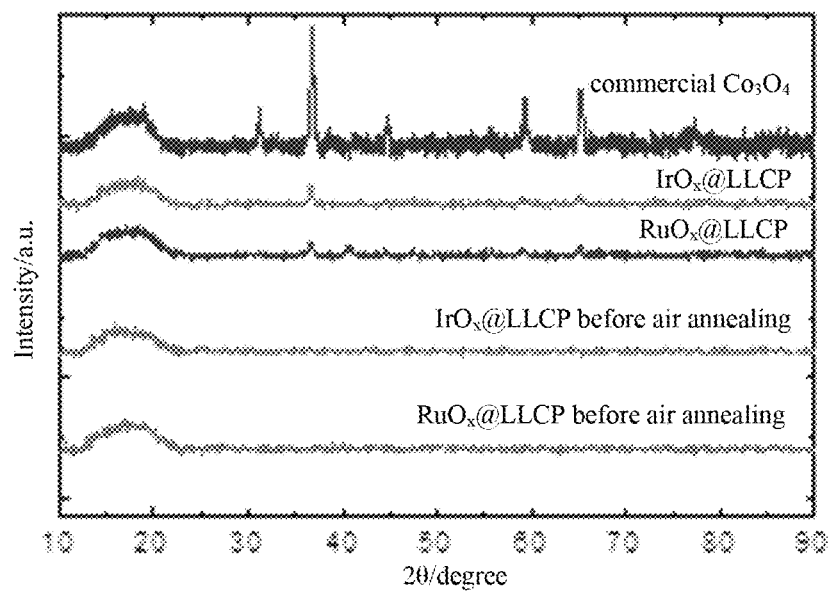
FIG. 9 shows x-ray diffraction ("XRD") characterizations of RuO$_x$@LLCP fiber and IrO$_x$@ LLCP fiber, as well as the samples before air annealing, with commercial Co$_3$O$_4$ as a reference.
Figure 19:
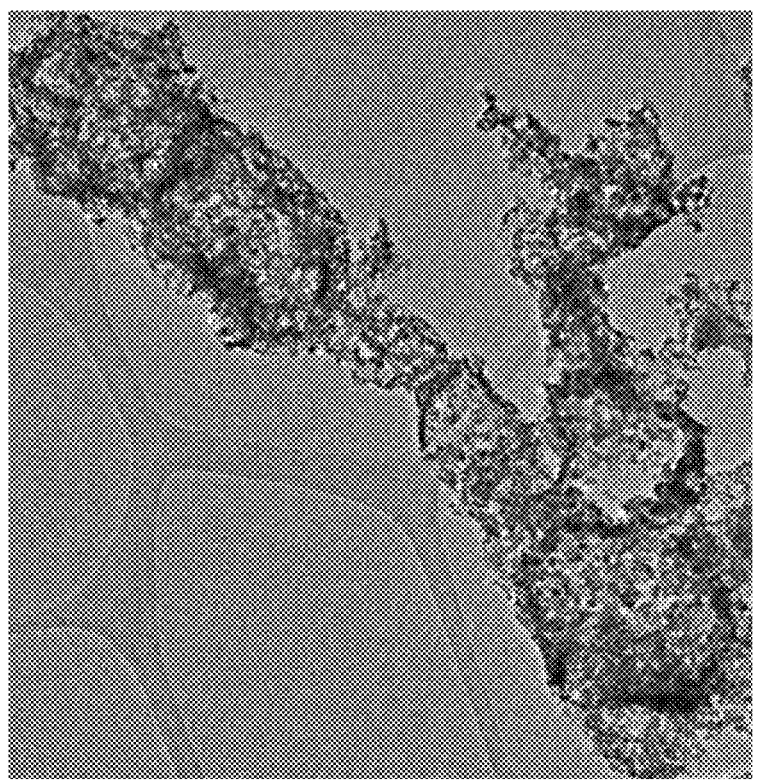
FIG. 19 shows a TEM image of the hollow structure of the catalyst maintaining the MOF morphology.
Figure 20:
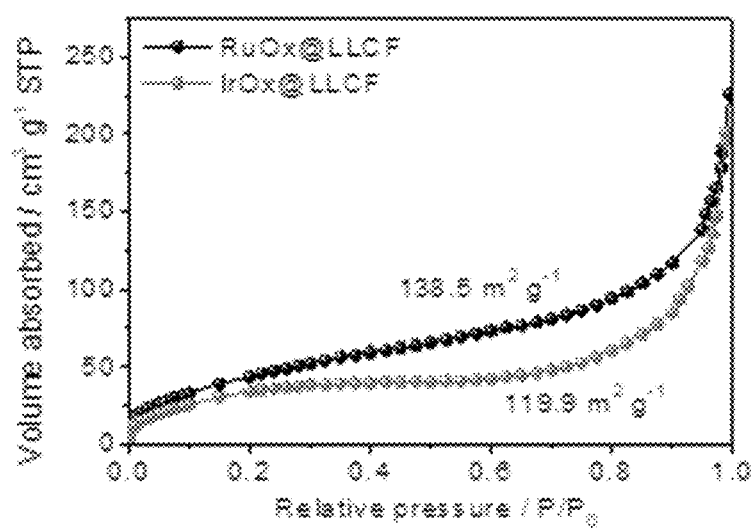
FIG. 20 shows N$_2$ absorption/desorption measurement, showing high specific surface are of 138.5 m$^2$/g$^{-1}$ and 119.9 m$^2$/g$^{-1}$ for Ru@LLCP and Ir@LLCP, respectively.
Figure 21:
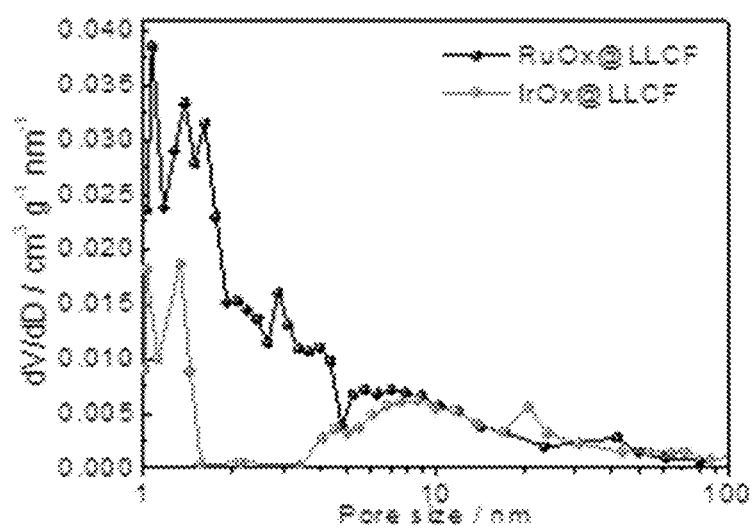
FIG. 21 shows N$_2$ absorption/desorption measurement, showing pore volume of 0.31 and 0.52 cm$^3$/g$^{-1}$ for Ru@LLCP and Ir@LLCP, respectively.

TEM reveals the hollow structure of the catalyst maintaining the MOF morphology (FIG. 19). The catalyst is also highly porous containing micro and macro pores, as shown by the arrows in FIG. 2. The highly porosity was further confirmed by N$_2$ absorption/desorption measurement, showing high specific surface are of 138.5 m$^2$/g$^{-1}$ and 119.9 m$^2$/g$^{-1}$ (FIG. 20), and pore volume of 0.31 and 0.52 cm$^3$/g$^{-1}$ for Ru@LLCP and Ir@LLCP (FIG. 21), respectively. The higher resolution TEM image clearly shows the dodecahedron hollow structure morphology composed of nanoparticles with average diameter of ~5 nm (FIG. 2). Additionally, it indicates an homogeneous dispersion of Ru and Ir over the support. HRTEM revealed a well-defined fringe of 0.28 nm, 0.16 nm and 0.245 nm, corresponding to the spacing of (022), (110), and (311) of spinel structured Co$_3$O$_4$ (FIG. 3). Interestingly, FIG. 3 indicates that Ru possesses a mixed structure of amorphous and crystalline, as the diffraction ring indicating the amorphous structure and a lattice space of 0.206 nm ascribing to Ru(101). The data coincide well with XRD pattern, in which except the diffraction peaks of ultra-fine crystalline Co$_3$O$_4$, neither Ir nor Ru or their related phases can be detected (FIG. 9). HAADF-STEM combined with EDX (FIG. 4) element mapping reveal that Co, La, and O were uniformly dispersed. While Ru is segregated to form heterostructure and parts are uniform dispersed with Co, La, and O over the MOF structure. The concentration of Ru and Ir could be in the range of 6-10%, respectively.

Figure 5:
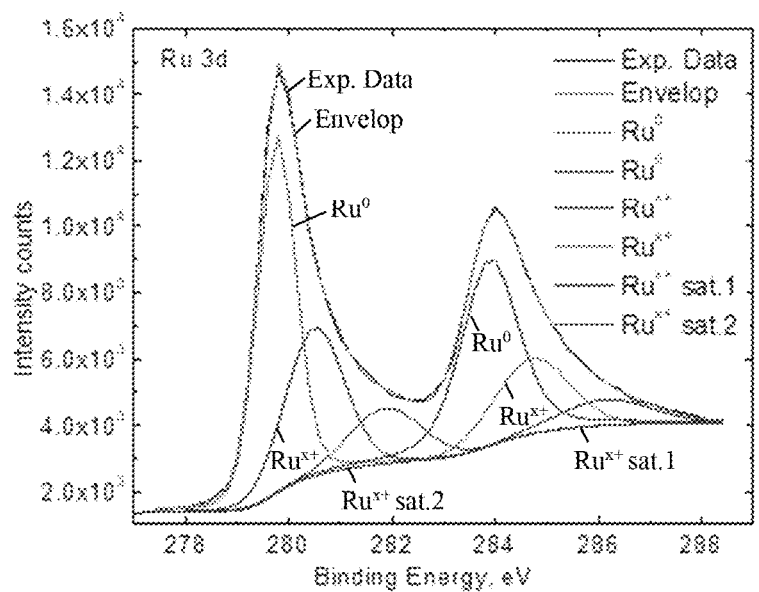
FIG. 5 shows x-ray photoelectron spectroscopy ("XPS") characterizations of RuO$_x$@LLCP fiber and IrO$_x$@LLCP fiber—(Ru 3d spectra).
Figure 6:
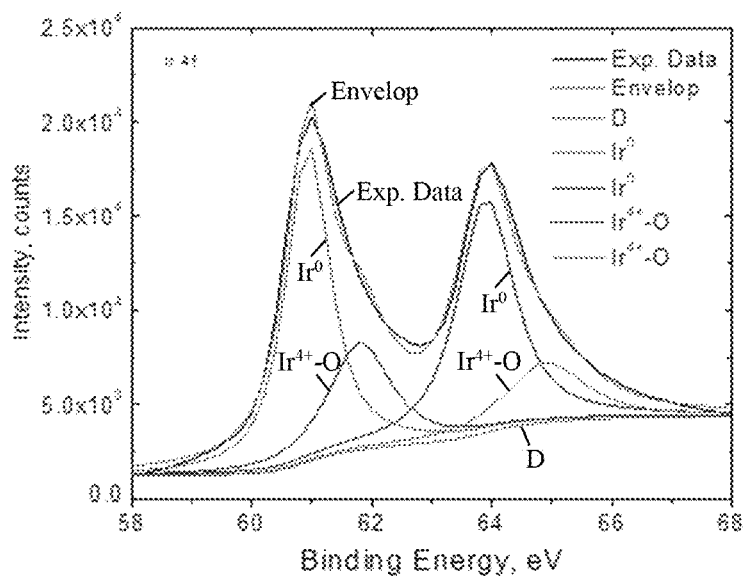
FIG. 6 shows XPS characterizations of RuO$_x$@LLCP fiber and IrO$_x$@LLCP fiber—(Ir 4f spectra).
Figure 7:
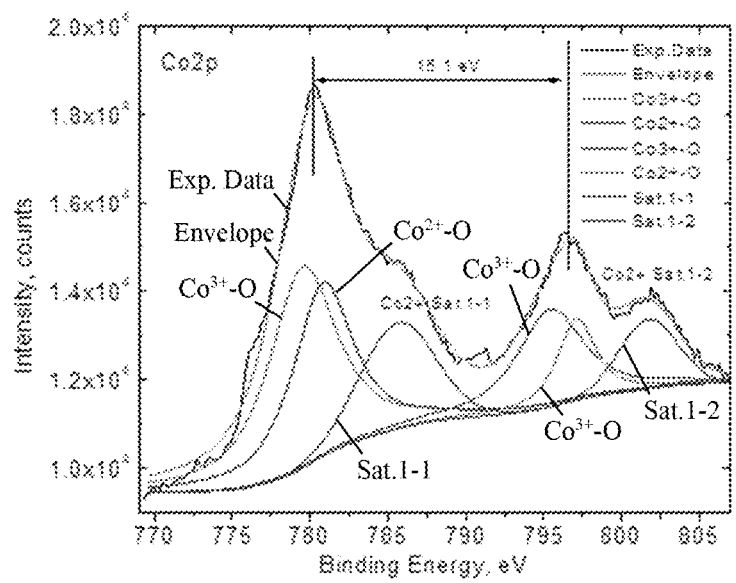
FIG. 7 shows XPS characterizations of RuO$_x$@LLCP fiber and IrO$_x$@LLCP fiber—(Co 2p spectra).
Figure 8:
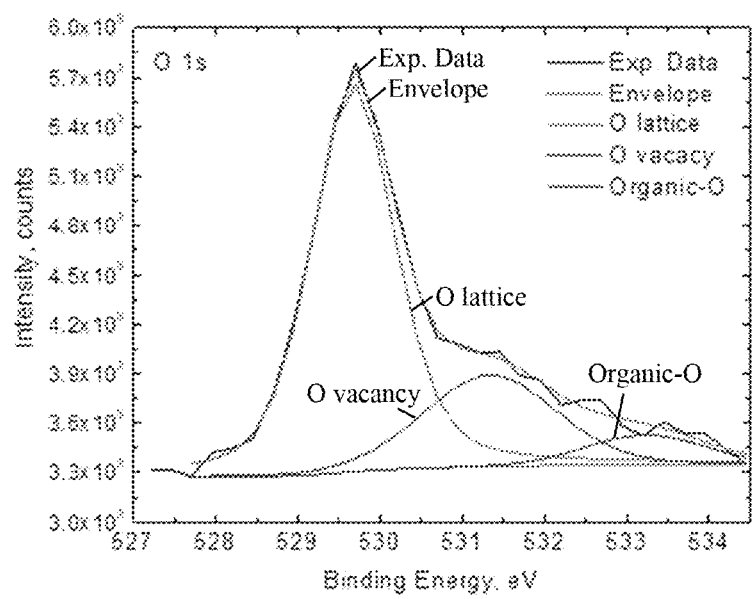
FIG. 8 shows XPS characterizations of RuO$_x$@LLCP fiber and IrO$_x$@LLCP fiber—(O 1s spectra).

To gain a deep insight of the surface chemical composition and oxidation state of Ir@LLCP and Ru@LLCP, XPS was employed. Ir 4f spectra of Ir@LLCP revealed the metallic nature of Ir$^0$, as binding energy at 60.9 eV is assigned to Ir 4f7/2 of Ir$^0$ (FIG. 6). Curve fitting indicates the formation of IrO$_x$ species on the surface with Ir in a mixed oxidation state comparable to a substoichiometric Ir-oxide material. Ru 3d XPS pattern also verified the dominating nature of metallic $Ru^0$, along with a certain of Ru oxide on the surface (FIG. 5). The formation of amorphous $IrO_x$ or $RuO_x$ on the surface benefits for the improved OER activity and durability. Co 2p XPS spectra of $IrO_x$@LLCP and $RuO_x$@LLCP exhibit two main peaks having distance of 15.1 eV (FIG. 7), in a good agreement with the spinel structured $Co_3O_4$. The present of satellites peaks located at 785.7 eV and 801.9 eV which implies a higher ratio of $Co^{2+}$ in the $Co_3O_4$ structure relative to standard $Co_3O_4$, suggesting an lower average oxidation state of Co in LLCP. O 1s XPS (FIG. 8) spectrum can be deconvoluted into three characteristic peaks at 529.7 eV assigned to lattice O bonded to metal, 531.4 eV corresponded to oxygen with defect indicating the formation of oxygen vacancy, and 533.3 eV was attributable to hydroxyl group or surface-adsorbed oxygen.

Figure 10:
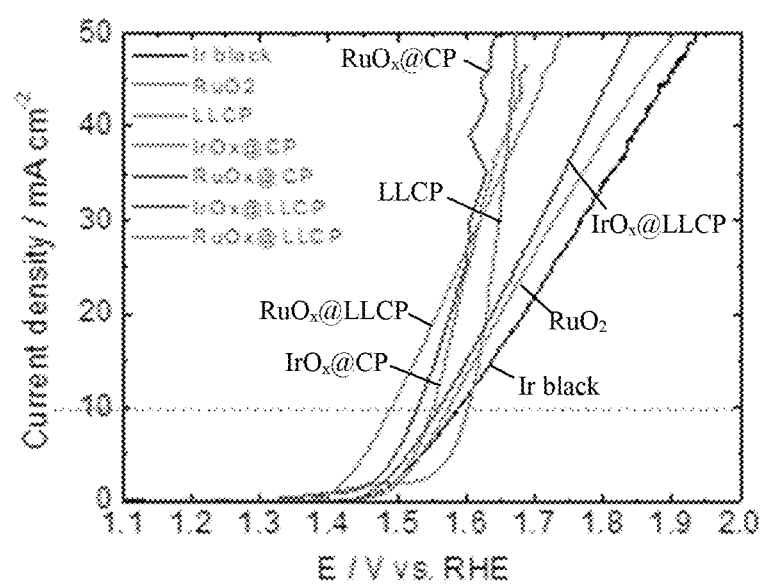
FIG. 10 shows polarization curves recorded on different Ru-based and Ir-based electrodes with a three-electrode configuration in 0.1M HClO$_4$ electrolyte.

The electrocatalytic OER performance of $IrO_x$@LLCP and $RuO_x$@LLCP were accessed with typical three electrode system in an $O_2$-saturated 0.1M $HClO_4$ aqueous electrolyte. $IrO_x$ and $RuO_x$ over $Co_3O_4$ derived from Co-MOF without La and Li doping, denoted as $IrO_x$@CP and $RuO_x$@CP, as well as LLCP and commercial Ir back, $RuO_2$ were tested under the same condition as benchmark. Before the lineal sweep voltammetry ("LSV") test, the catalyst were subjected to CV cycles at a sweep rate of 50 mV/s$^{-1}$ in the electrolyte until a stable CV curve was observed. LSV polarization curves were obtained at a scan rate of 10 mV/s$^{-1}$ with 95% iR compensation. Among these electrodes, $RuO_x$@LLCP and $IrO_x$@LLCP electrodes exhibit the highest OER catalytic activity as compared to their corresponding counterparts (FIG. 10), where an overpotential as low as ~256 mV and ~297 mV vs. RHE is required to yield a geometric current density of 10 mAcm$^{-2}$, respectively, whereas, commercial $RuO_2$ and Ir black require 338 mV and 340 mV vs. RHE, respectively.

Figure 11:
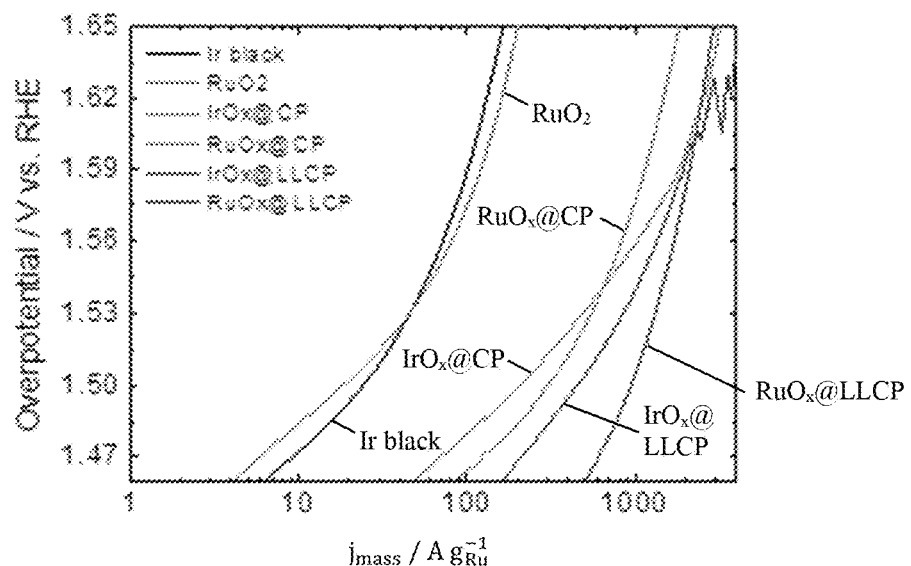
FIG. 11 shows the relevant Tafel plots of the catalysts studied in FIG. 10.

It is worth noting that without La and Li doping, the $IrO_x$@CP and $RuO_x$@CP display the inferior OER activities to $RuO_x$@LLCP and $IrO_x$@LLCP, but still comparable to $RuO_2$ and Ir black, respectively, at ⅛ precious metal loading of that used in the benchmarks. Compared with the conventional OER inactive oxide support for Ir/Ru bearing OER catalyst, our support is highly active, possessing densely populated OER active site that fully accessible to the electrolyte, and high porosity and high surface area facilitating the mass transfer. Combined with its initial high conductivity, LLCP required only 371 mV to drive 10 mAcm$^{-2}$ current density. The advanced hybrid amorphous structure of our $IrO_x$ and $RuO_x$ with the initial OER highly activity support, enable our catalyst possessing the smaller overpotential than those of most currently reported OER electrocatalyst, indicating that $RuO_x$@LLCP and $IrO_x$@LLCP are outstanding OER catalysts in acid. The steady-state electrochemical analysis shown in FIG. 11, reveals that the $RuO_x$@LLCP and $IrO_x$@LLCP possess smaller Tafel slope of 56 mVdec$^{-1}$ and 58 mVdec$^{-1}$, respectively, which further demonstrate our catalysts are highly OER active possessing fast OER kinetics, and also suggests that our catalysts require lower energy consumption for electrochemical processes.

Figure 22:
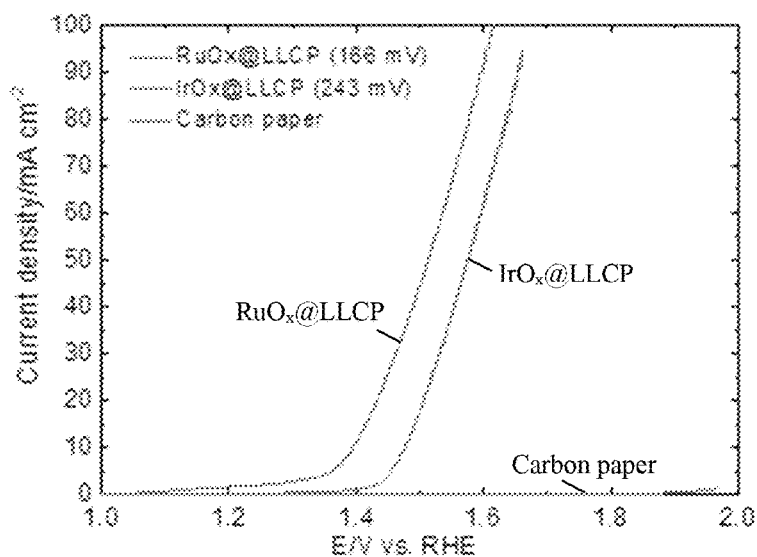
FIG. 22 shows test results under 0.1M HClO$_4$ electrolyte.
Figure 23:
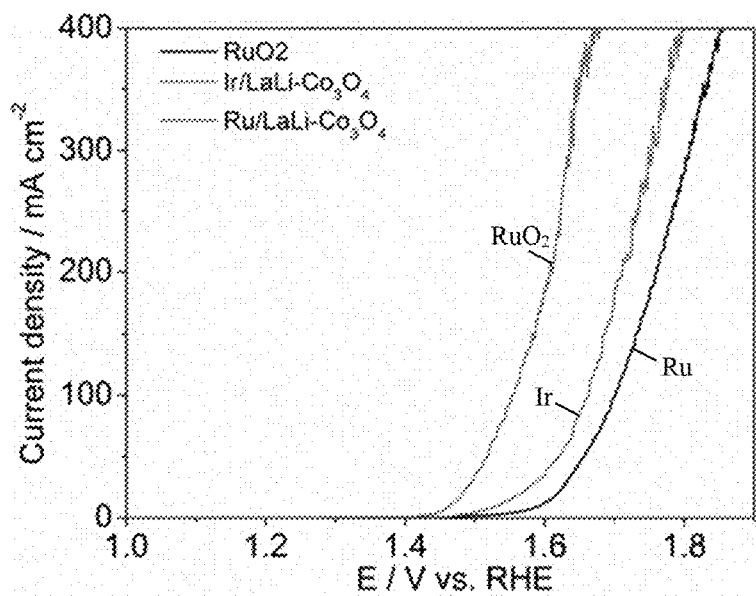
FIG. 23 shows test results under 0.5M H$_2$SO$_4$.

The two catalysts were also loaded onto carbon paper and tested under 0.1M $HClO_4$ electrolyte, which revealed a further decreased overpotential to 0.17V and 0.25V for $RuO_x$@LLCP and $IrO_x$@LLCP (FIG. 22), respectively. As high H+ concentration leads to a higher electrical conductivity, fast hydrogen production and potential superior catalytic activity. Further tests under 0.5M $H_2SO_4$ revealed a further improved OER activity with enhanced high current density, as shown in FIG. 23.

Figure 12:
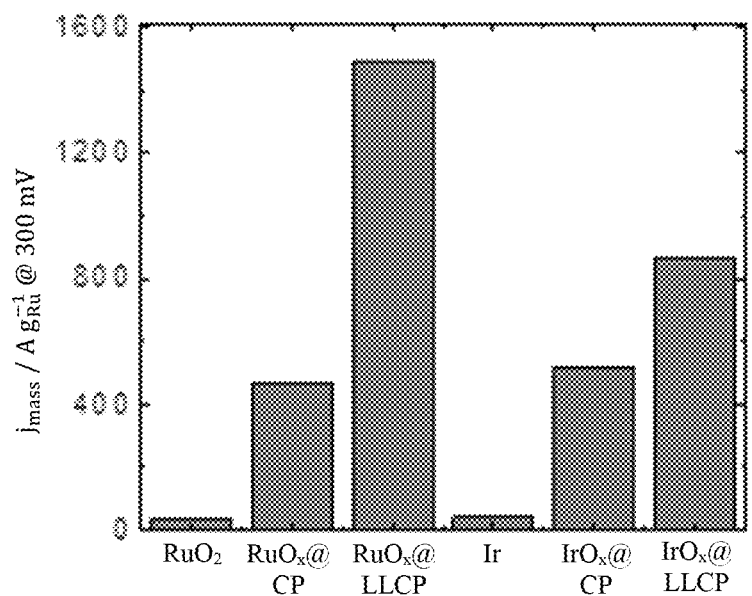
FIG. 12 shows Ru and Ir mass activity of different electrodes at an overpotential of 300 mV.

This process can be extended to TMs other than Li (e.g., Ni, Mo, Fe), and all the materials demonstrated excellent OER activities under acid (FIG. 24). For full consideration electrolysis, the Ir and Ru mass are compared based activity of our catalyst with that of the published ones. Clearly, as shown in FIG. 12, the $RuO_x$@LLCP and $IrO_x$@LLCP outperform their corresponding counterparts, showing the higher mass normalized current density of ~1400 $A \cdot g_{Ru}^{-1}$ and ~860 $A \cdot g_{Ir}^{-1}$ at 300 mV overpotential, respectively. Compared with $RuO_x$@CP and $RuO_2$ benchmark, $RuO_x$@LLCP is 2.5 and 29 times more active on an Ru mass basis at overpotential of 300 mV vs. RHE. Meanwhile, our $IrO_x$@LLCP is 1.6 and 21 times more active on Ir mass basis than $IrO_x$@CP and Ir black. It is worth noting that the mass activity of our $IrO_x$@CP is already higher than that of reported amorphous Ir NP (221.8 $A \cdot g_{Ir}^{-1}$ at 300 mV overpotential), Ru@$IrO_x$ (644.8 $A \cdot g_{Ru+Ir}^{-1}$ at 300 mV overpotential), and state-of-art $IrO_x$ (300 $A \cdot g_{Ir}^{-1}$ at 300 mV overpotential) and is comparable to $IrNiO_x$ (~500 $A \cdot g_{Ir}^{-1}$ at 300 mV overpotential). The high specific surface area that expose much more active sites assessable to the electrolyte, contributing to their high mass activity. Taking advantages of both PGM catalysts and PGM-free catalysts enable our catalysts $RuO_x$@LLCP and $IrO_x$@LLCP to be among the highest OER active catalysts for water electrolysis.

Figure 13:
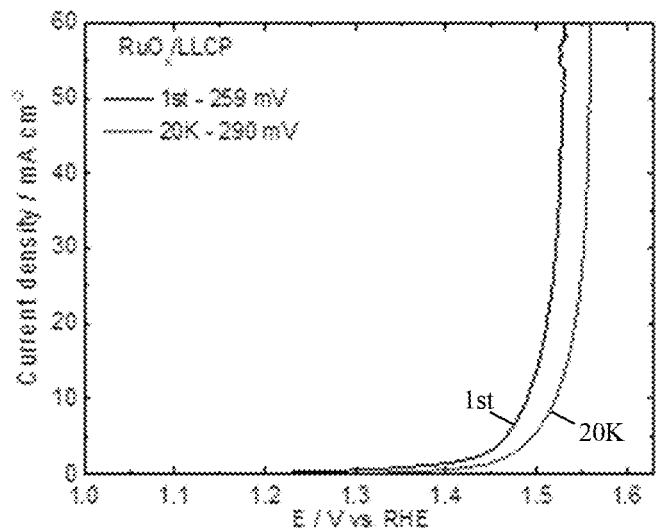
FIG. 13 shows polarization curves of the RuO$_x$@LLCP fiber catalyst.
Figure 14:
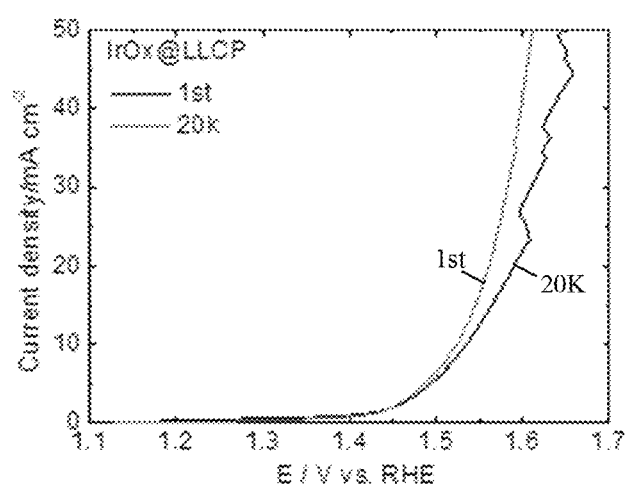
FIG. 14 shows polarization curves of the IrO$_x$@LLCP fiber catalyst.
Figure 15:
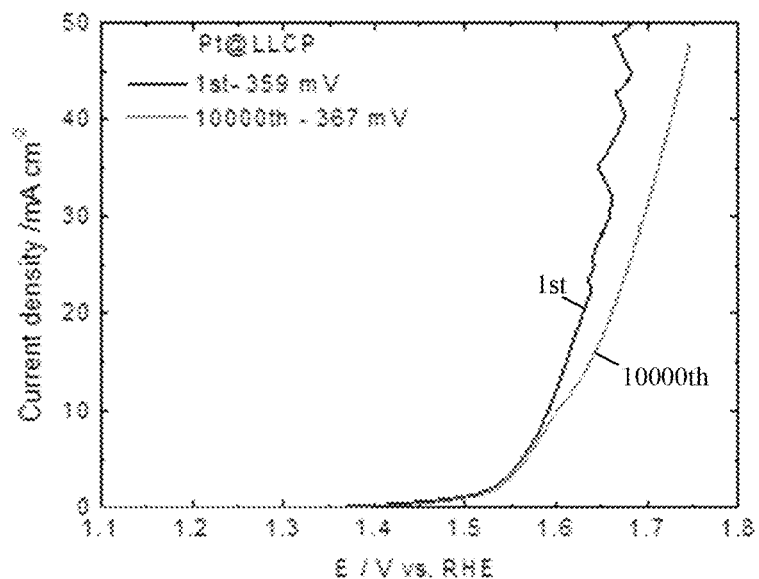
FIG. 15 shows polarization curves of the Pt@LLCP fiber catalyst at different cycles until 20,000 cycles.
Figure 25:
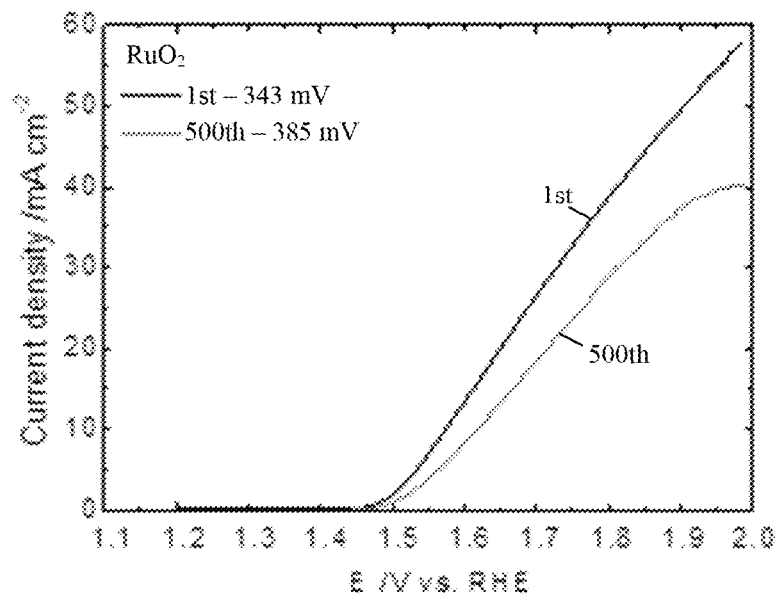
FIG. 25 shows test results for stability by CV cycles.
Figure 26:
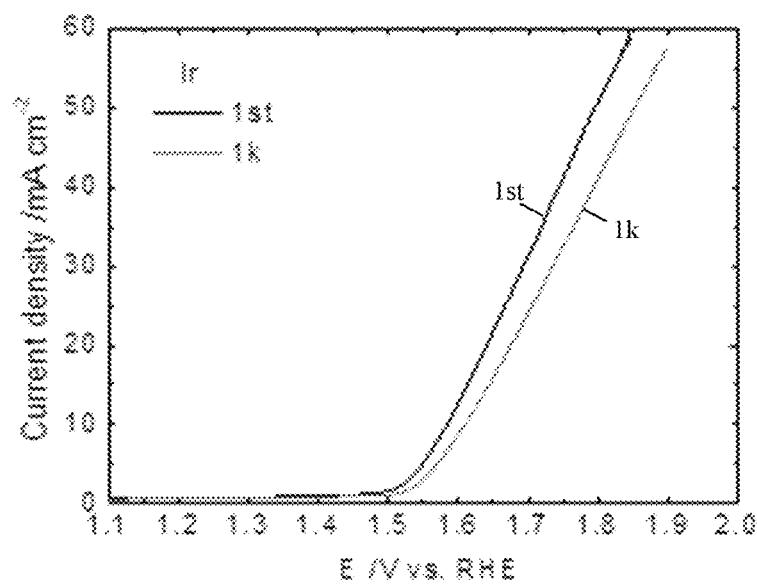
FIG. 26 shows test results for current density after 1,000 cycles.

In addition to activity, stability is another critical criterion for evaluating an electrocatalyst. As shown in FIG. 13, upon accelerated stress test for 20,000 cycles, the anodic potential of $RuO_x$@LLCP only decay ~31 mV at 10 mAcm$^{-2}$ current density. It is worth noting that the anodic current density of $IrO_x$@LLCP exhibits an slightly increase after 20,000 cycles compared with its initial state (FIG. 14). Pt@LLCP was synthesized by using the same method except the precious metal precursor was replace by Pt based precursor material. Pt@LLCP also shows comparable stability (FIG. 15). By contrast, commercial $RuO_2$ show very poor stability by CV cycles (FIG. 25). Ir black decays 25 mV at 10 mAcm$^{-2}$ current density after 1,000 cycles (FIG. 26). To the best of our knowledge, both $RuO_x$@LLCP and $IrO_x$@LLCP represent the best OER catalysts so far reported.

Figure 16:
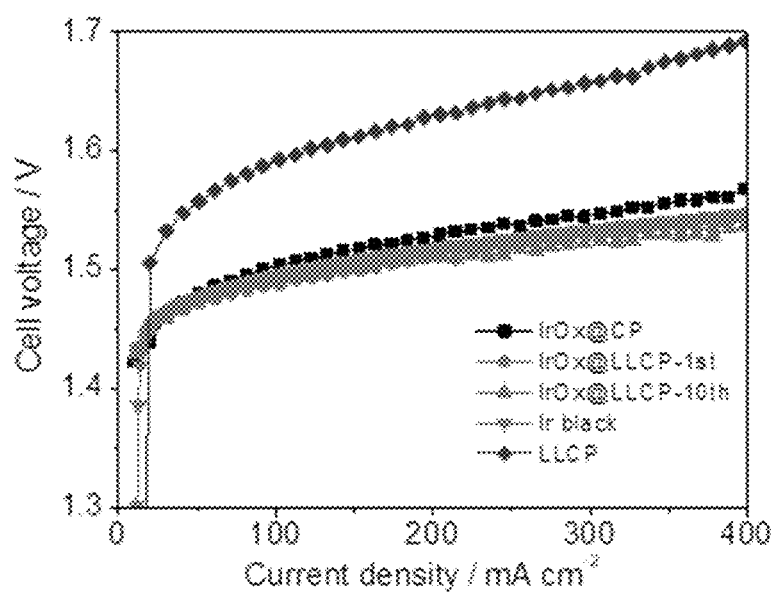
FIG. 16 shows polarization curves of PEM electrolysis cell with IrO$_x$@LLCP as anodic catalyst.
Figure 17:
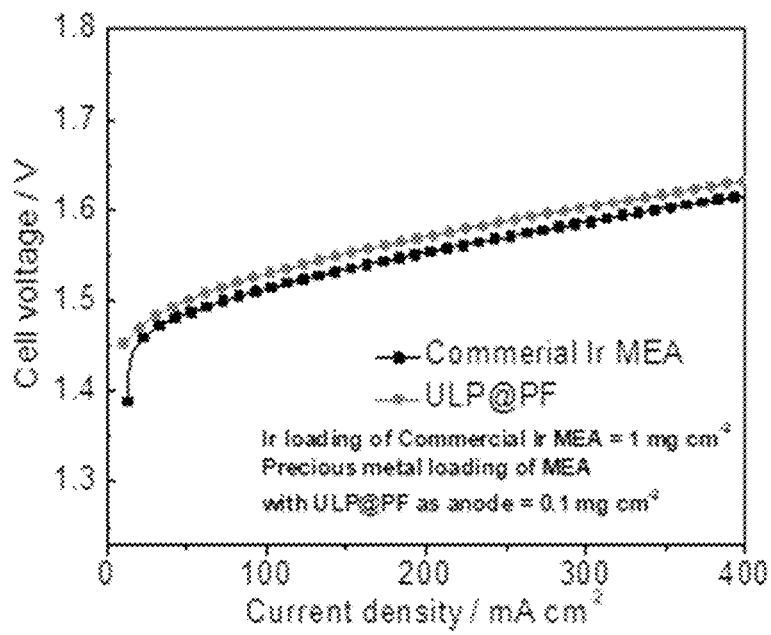
FIG. 17 shows polarization curves of PEM electrolysis cell with RuO$_x$@LLCP as anodic catalyst with iR-compensation.
Figure 18:
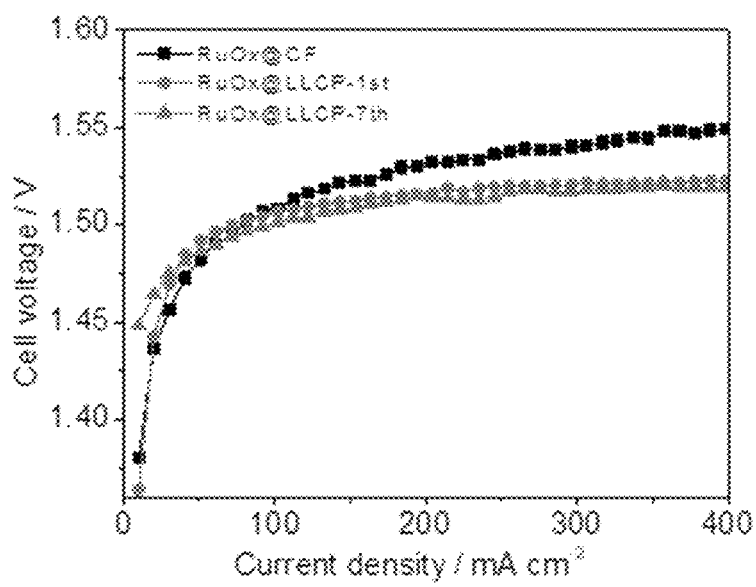
FIG. 18 shows polarization curves of PEM electrolysis cell with RuO$_x$@LLCP as anodic catalyst without iR-compensation.

With an eye toward commercial applications, fabricate $RuO_x$@LLCP and $IrO_x$@LLCP were fabricated into the MEA serving as anode catalysts to investigate their water splitting performance in an operating PEM single cell. FIGS. 16-18 show the polarization curves of $RuO_x$@LLCP (FIGS. 17-18) and $IrO_x$@LLCP (FIG. 16) serving as anodic catalysts in real operating PEMWE cell. LLCP, $IrO_x$@CP, $RuO_x$@CP, and $IrO_x$ were also measured under the same test condition as control sample and benchmark. Clearly, LLCP is also OER active in the operating PEM single cell. After combine with $IrO_x$ and $RuO_x$, even with precious metal loading being ⅙ of that used in commercial $IrO_x$ based MEA, the OER activities of MEAs with $RuO_x$@LLCP and $IrO_x$@LLCP as anode catalysts are significantly improved, respectively, and even superior to that of $IrO_x$ (FIGS. 16-18). La and Li dopants indeed contribute to the improved OER performance by enhancing the electron conductivity of the PGM-free support through generating oxygen vacancy. The PEM cell was further tested with $RuO_x$@LLCP and $IrO_x$@LLCP as anode catalysts for 7 and 10 cycles, respectively, by sweeping current from 0 A-2 A with scan rate of 0.002 A/min$^{-1}$. Negligible changes were observed for both two cells, indicating excellent stability of their unique structures. This is the first time that a synergistic OER catalyst containing PGM-free catalyst as support and ultra-low loading PGM catalyst with amorphous structured $IrO_x$ and $RuO_x$ demonstrating high activity in the PEM single cell. This work paves a new way for development of advanced catalyst for water splitting and the research beyond.

Definitions

As used herein, the singular forms "a", "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method comprising:
preparing a platinum group metal (PGM)-free metal organic framework (MOF) material comprising MOF crystals;
forming a mixture of MOF crystals suspended in a polymer solution;
electrospinning the MOF crystals and polymer mixture, forming porous and interconnected nanofibers having MOF crystals uniformly dispersed;
subjecting the metal organic framework containing porous nanofiber to a first heat treatment forming carbon-based nanofibers;
depositing a platinum group metal on the carbon-based nanofibers forming a platinum group metal on nanofiber structure; and
annealing the platinum group metal on nanofiber structure, removing carbon and forming a PGM catalyst on a non-PGM metal oxide, carbon-free catalytic support.

2. The method of claim 1, wherein the metal organic framework comprises a cobalt metal organic framework.

3. The method of claim 1, wherein the metal organic framework comprises La co-doped with a transition metal selected from the group consisting of Co, Fe, Mn, Mo, Li, Nb, Ta, Zr, Y, and W.

4. The method of claim 1, wherein the first heat treatment is a sequential thermolysis of the porous nanofiber.

5. The method of claim 4, wherein the thermolysis comprises a thermal conversion temperature of between 300° C. and 900° C. for a thermal treatment period of 3-9 hours.

6. The method of claim 4, wherein the thermolysis comprises a thermal conversion temperature of between 250° C. and 500° C. for a thermal treatment period of 1-6 hours.

7. The method of claim 4, further comprising, following thermolysis, reducing the platinum group metal over the carbon based nanofibers.

8. The method of claim 7, wherein reducing the platinum group metal comprises a solvothermal process and the use of a surfactant and a reducing agent selected from the group consisting of Benzyl alcohol, or salicylic acid or oleylamine.

9. The method of claim 1, wherein depositing platinum group metal comprises depositing a metal selected from the group consisting of Ir, Ru, Pt, Rh, Pd, and combinations thereof.

10. The method of claim 1, wherein the thermolysis is undergone in an environment selected from the group consisting of inert, reducing, and oxidizing.

11. The method of claim 1, wherein the deposited platinum group metal has a mixture of amorphous and crystalline structure.

12. The method of claim 1, further comprising oxidizing a portion of the platinum group metal after deposition.

13. A nanofiber catalyst comprising:
a transition metal oxide fibrous material having a plurality of pores within a series of transition metal oxide particles inter-connected and fused together in a nanofibrous network wherein the transition metal oxide particles comprise one or more of Co, Fe, Mn, Mo, Li, Nb, Ta, Zr, Y, and W; and a plurality of platinum group metal particles disposed on the transition metal oxide particles wherein the plurality of platinum group particles comprise a metal selected from the group consisting of Ir, Ru, Pt, Rh, Pd, and combinations thereof, further wherein the plurality of platinum group metal particles have a mixture of amorphous and crystalline structures.

14. The nanofiber catalyst of claim 13, wherein the transition metal oxide fibrous material is carbon-free.

* * * * *